United States Patent
Schmitz et al.

(10) Patent No.: US 10,324,777 B2
(45) Date of Patent: Jun. 18, 2019

(54) REGISTER-BASED COMMUNICATIONS INTERFACE

(71) Applicant: HEWLETT PACKARD ENTERPRISE DEVELOPMENT LP, Houston, TX (US)

(72) Inventors: Christoph L. Schmitz, Houston, TX (US); Thomas Donald Rhodes, Houston, TX (US); Nicholas Mark Hawkins, Houston, TX (US); Binh Nguyen, Houston, TX (US); Wayne Hsu, Houston, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 182 days.

(21) Appl. No.: 15/335,958

(22) Filed: Oct. 27, 2016

(65) Prior Publication Data

US 2018/0121087 A1    May 3, 2018

(51) Int. Cl.
*G06F 12/00* (2006.01)
*G06F 11/00* (2006.01)
*G06F 9/30* (2018.01)
*G06F 12/02* (2006.01)

(52) U.S. Cl.
CPC .......... *G06F 11/00* (2013.01); *G06F 9/3004* (2013.01); *G06F 9/30032* (2013.01); *G06F 9/30105* (2013.01); *G06F 12/02* (2013.01); *G06F 12/0238* (2013.01)

(58) Field of Classification Search
None
See application file for complete search history.

(56) References Cited

U.S. PATENT DOCUMENTS 8,271,766 B2 * 9/2012 Hoshi ............... G06F 9/30032
                                                      712/217

* cited by examiner

*Primary Examiner* — Midys Rojas
(74) *Attorney, Agent, or Firm* — Hewlett Packard Enterprise Patent Department

(57) ABSTRACT

An example device may include processing circuitry and a management controller. The processing circuitry may include a communications interface that includes a first register and a second register. The first register may include a freshness bit and a number of first data bits. The second register may include a number of second data bits that correspond, respectively, to the first data bits. The processing circuitry may write variously to the first data bits in response to detected events, set the freshness bit in response to the management controller reading the first data bits, and reset the freshness bit if any of the first data bits are written to. The management controller may read the first data bits, perform predetermined processing based thereon, write to the second data bits based on the predetermined processing, and request a register transfer. The processing circuitry may, in response to the management controller requesting the register transfer, transfer values of the second data bits to their respectively corresponding first data bits if and only if the freshness bit is currently asserted.

16 Claims, 11 Drawing Sheets

Fig. 2

| | W-Fail | Fresh | D1_1 | D1_2 | ... | D1_N |
|---|---|---|---|---|---|---|
| | meaning | meaning | meaning | meaning | | meaning |
| not asserted | Register transfer OK | data not fresh | event cleared | event cleared | ... | event cleared |
| asserted | Register transfer failed | Data is fresh | event #1 detected | event #2 detected | ... | event #N detected |

| | Read | Write | D2_1 | D2_2 | ... | D2_N |
|---|---|---|---|---|---|---|
| | meaning | meaning | meaning | meaning | | meaning |
| not asserted | - | - | Clear event #1 | Clear event #2 | ... | Clear event #N |
| asserted | Data read initiated | Register transfer requested | Do not clear event #1 | Do not clear event #2 | ... | Do not clear event #N |

Fig. 3

| | W-Fail | Fresh | D1_1 | D1_2 | ... | D1_N |
|---|---|---|---|---|---|---|
| | value | value | value | value | | value |
| not asserted | 0 | 0 | 0 | 0 | ... | 0 |
| asserted | 1 | 1 | 1 | 1 | ... | 0 |

| | Read | Write | D2_1 | D2_2 | ... | D2_N |
|---|---|---|---|---|---|---|
| | value | value | value | value | | value |
| not asserted | 0 | 0 | 0 | 0 | ... | 0 |
| asserted | 1 | 1 | 1 | 1 | ... | 0 |

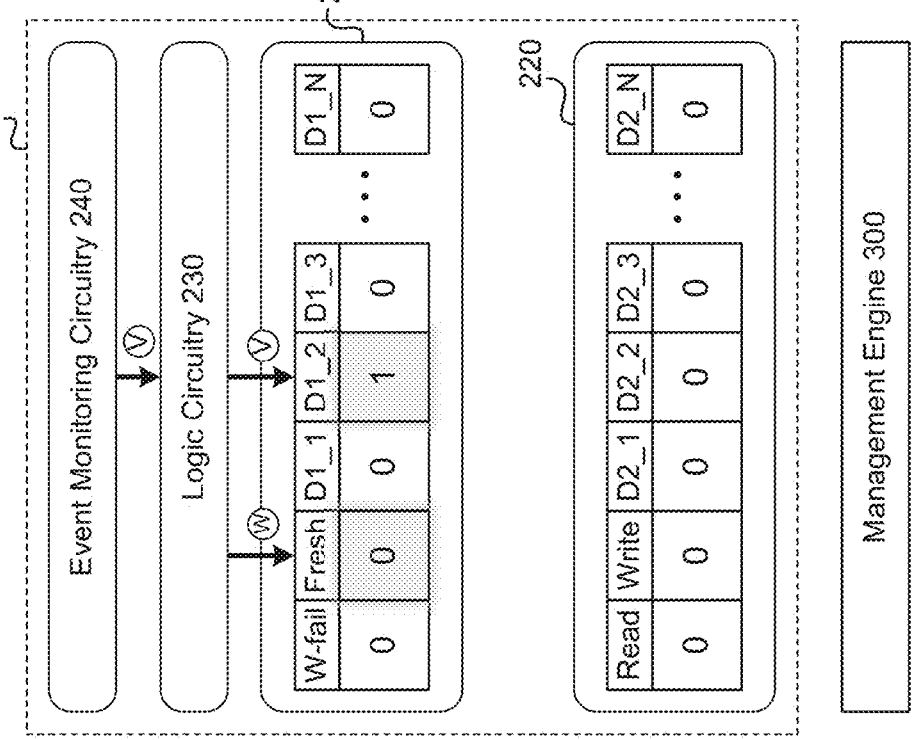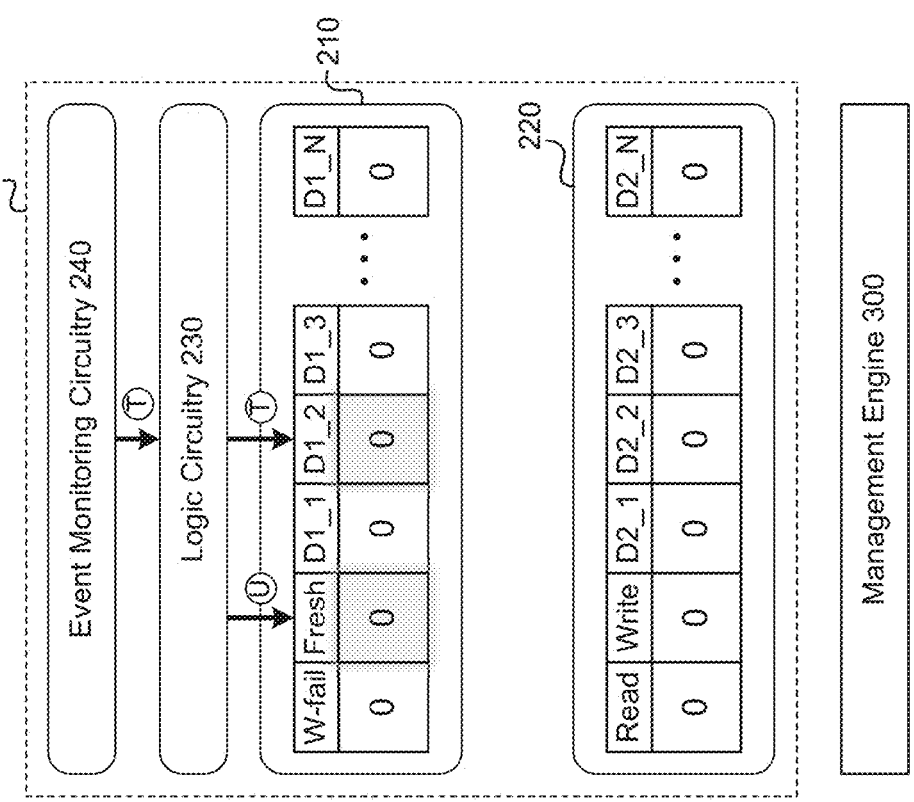

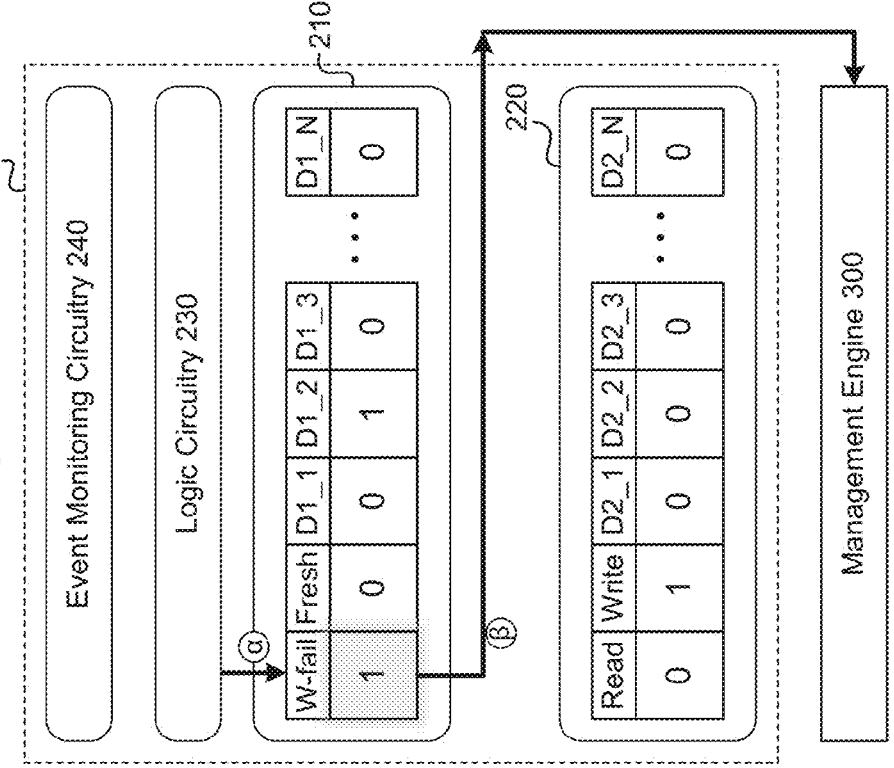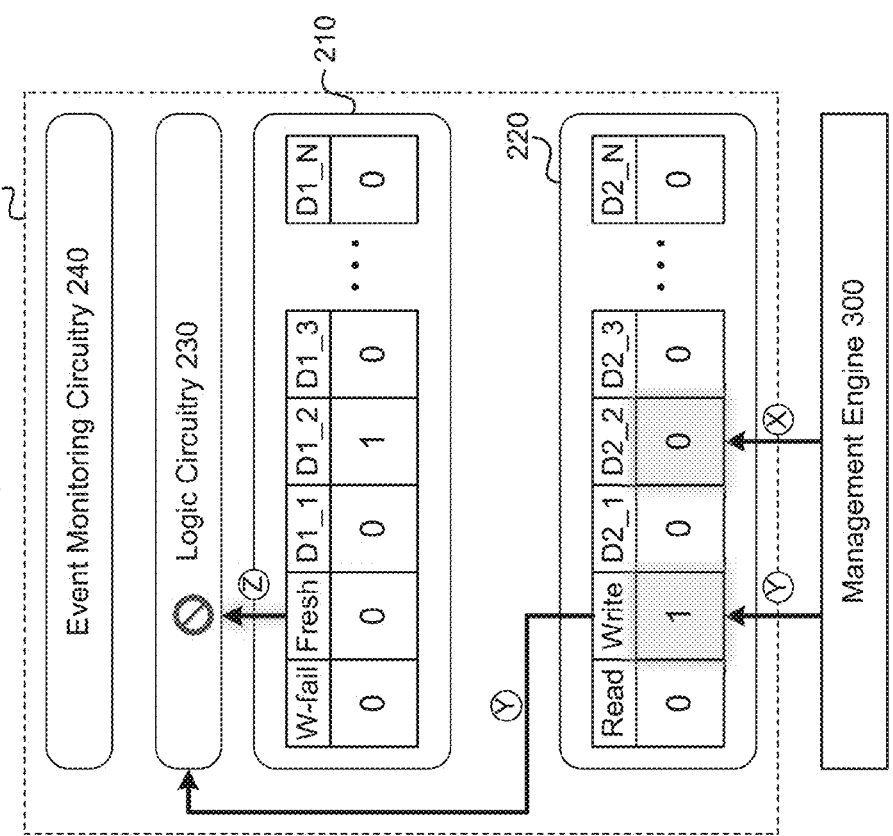

REGISTER-BASED COMMUNICATIONS INTERFACE

BACKGROUND

Computing devices, such as servers, may have various components that may communicate with one another and/or with components of external devices via various communications interfaces. In this context, a "component" of a computing device may be a piece of dedicated hardware (e.g., an ASIC), or an engine that comprises machine readable instructions being executed by a processor, or any combination of these.

BRIEF DESCRIPTION OF THE DRAWINGS

FIG. 2 illustrates tables showing example meanings of an asserted state and a not-asserted state for various bits of example first and second registers included in the example processing circuitry.

FIG. 3 illustrates tables showing an example relationship between logic values and the asserted and not-asserted states for various bits of the example first and second registers.

FIG. 11 illustrates example operations of: resetting the first data bit that had previously been set (operation T), and resetting the freshness bit (operation U), which are performed incident to the example processing circuitry clearing the previously detected event subsequent to the first register having been read in operation E.

FIG. 12 illustrates example operations of: setting again the first data bit that had previously been set and reset (operation V), and resetting the freshness bit (operation W), which are performed incident to the example processing circuitry detecting the event again subsequent to clearing the event in operation T.

FIG. 13 illustrates example operations of: resetting a second data bit (operation X), setting the write bit (operation Y), and checking that the freshness bit is currently asserted (operation Z), which are performed incident to a writing operation subsequent to operation W, wherein there were two intervening writes to the first data bits between operation E and operation X.

FIG. 14 illustrates example operations of: setting the write fail bit and disallowing the register transfer (operation α), and a notification of a failed write (operation β), which are performed as a result of a negative determination in operation Z (i.e., the freshness bit is currently not-asserted).

DETAILED DESCRIPTION

Figure 1:
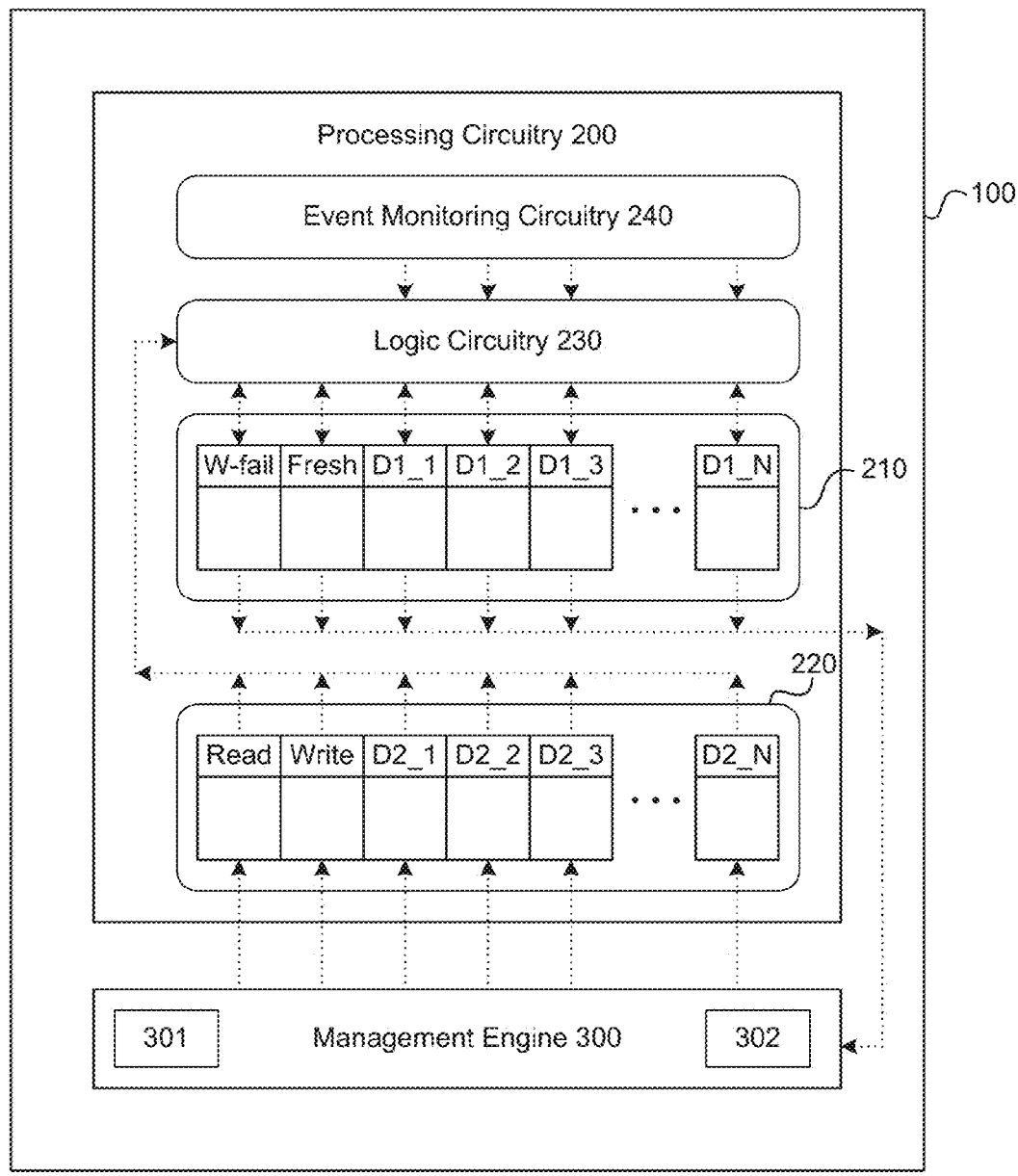
FIG. 1 illustrates an example device with example processing circuitry and an example management engine.

An example register-based communications interface may include a collection of registers that may be used by a pair of components to communicate with one another. For example, a register-based communications interface may include a first register and a second register, and a pair of components may communicate via such an interface by writing values to and reading values from the bits of the first and second registers.

Such example register-based communications interfaces may be useful in interfacing between two components that have different communications latencies. For example, a register-based communications interface may be useful for communications between a dedicated hardware component that has very fast response speeds and an engine that has relatively slow response speeds (as used herein, an "engine" is formed by a processor executing machine-readable instructions—for example, an engine may be an application or computer program during runtime).

An example of such a pair of components that may beneficially communicate via a register-based communications interface includes hardware-monitoring circuitry and a management controller (e.g., a baseboard management controller (BMC)). Hardware monitoring circuitry may comprise dedicated hardware (such as, for example, a complex programmable logic device (CPLD)) that is included in a computing device for monitoring the status of other components of the computing device. A server management engine (which may be, for example, part of a BMC) may be an application that allows for an administrator to remotely monitor and manage the computing device, which may include remotely monitoring the status of hardware (e.g., enclosure temperature), remotely controlling certain hardware of the computing device (e.g., increasing fan speed), remotely accessing firmware settings (e.g., Basic Input/Output System (BIOS) or Unified Extensible Firmware Interface (UEFI)), remotely installing an operating system, remotely correcting issues that prevent booting, remotely powering on or off the device, and so on. The hardware monitoring circuitry may use the register-based communications interface, for example, to communicate to the management engine information about the status of hardware (e.g., hardware events), and the management engine may use the register-based communications interface, for example, to communicate commands to the hardware monitoring circuitry.

In certain circumstances, components that are communicating via a register-based communications interface do not modify the same registers as one another. However, in certain circumstances, it may be desirable for both components that are communicating via a register-based communications device to be able to cooperatively modify the same register. For example, in the context of hardware monitoring circuitry and a management engine, when the hardware monitoring circuitry sets a bit in a register of a register-based communications interface to indicate a hardware event was detected, it may be desirable for the management engine to be able to clear this bit.

When the two components are able to modify the same register of a register-based communications interface, there is potential for an issue to arise (referred to hereinafter as a "race condition problem") in which one component starts a read-modify-write operation on the register, an intervening write to the register occurs before the read-modify-write operation is completed, and then the read-modify-write operation is completed without the component that started the read-modify-write being aware of the intervening write. A read-modify-write operation includes reading values from the register, performing some processing based on the read values, and then writing back (directly, or indirectly) to the register based on the processing. An "intervening write" is a write by a first component to a register that occurs after a second component has initiated a read-modify-write operation but before the read-modify-write operation has been completed (i.e., before the second component has written back to the register). Because the first component is unaware that the value of the intervening write's bit has changed in the time since it last read the register, when the first component completes the read-modify-write operation by writing back to the register, the first component may write back the old (and now incorrect) value to the bit. Thus, the information that the intervening write was supposed to convey (e.g., that an event was detected) may unintentionally be lost without the first component ever becoming aware of it. Such a race condition problem is particularly likely to occur when one of the components has a much faster latency than the other component.

For example, hardware monitoring circuitry may detect events and write to a register to indicate these events with a latency that is much faster (perhaps orders-of-magnitude faster) than the latency with which a management engine may read from the register, process the information from the register, and write back to the register. Thus, for example, a race condition problem may occur between example hardware monitoring circuitry and an example management engine as follows. First, the hardware monitoring circuitry detects an event and sets a corresponding data bit in a register to the value 1 to indicate the event was detected, with the other data bits all remaining at the value 0 to indicate their corresponding events were not detected. Next, the management engine reads the register, and begins processing to determine whether the asserted data bit should be cleared (i.e., whether the event has been resolved). Before the management engine has completed its processing and written back to the register, the hardware monitoring circuitry detects another event and sets its corresponding data bit in the register. The management engine, having decided that the first asserted data bit should be cleared and unaware of the intervening write to the second data bit, writes zeros to all of the data bits of the register with the intent to clear the first data bit but also unwittingly clearing the second data bit as well. Thus, the management engine may never become aware of the event indicated by the intervening write, since the data bit indicating that event was inadvertently cleared.

Accordingly, example devices described herein may include example register-based communications interfaces that are designed to prevent such race condition problems while still allowing both components that are communicating via the interface to modify the same register. In particular, certain example devices may be configured to automatically prevent a read-modify-write from being completed if there have been any intervening writes. For example, certain example devices described herein may include a specific bit ("freshness bit") in a first one of the registers whose state automatically controls whether or not a register transfer (which is a part of the read-modify-write) may be performed, and this bit may automatically be set/reset so as to prevent the register transfer if there have been any intervening writes (the register transfer comprising transferring values from the second register over to the first register).

For example, certain example devices described herein may include processing circuitry and a management engine (which may also be referred to as a management controller) that communicate with one another via a communications interface comprising an example first register and an example second register. The example first register may include a freshness bit and a number of first data bits, while the example second register may include a number of second data bits that correspond, respectively, to the first data bits. The example first register may be read-only to the management engine (i.e., the management engine cannot directly write to the first register). However, the management engine may be able to indirectly modify the first data bits of the first register by writing to the second data bits of the second register and then requesting a register transfer operation, which, in this context, comprises atomically transferring the values of second data bits to their corresponding first data bits. Thus, the processing circuitry and the management engine may both be able to cooperatively modify the first register. Furthermore, as mentioned above, the freshness bit may control whether or not the register transfer operation may be performed. In particular, the registers and the processing circuitry may be configured such that the register transfer operation is permitted if and only if the freshness bit is asserted.

Moreover, in example devices described herein the processing circuitry may be to write variously to the first data bits in response to detected events, and the management engine may be to perform a read-modify-write operation based on the first data bits (e.g., read the first data bits, perform predetermined processing based thereon, write to the second data bits based on the predetermined processing, and request a register transfer). In addition, the processing circuitry may be configured to set the freshness bit in response to the management engine requesting to read the first data bits, and reset the freshness bit if any of the first data bits are written to. Furthermore, the processing circuitry may be configured to, in response to the management engine requesting the register transfer, transfer values of the second data bits to their respectively corresponding first data bits if and only if the freshness bit is currently asserted.

Because the freshness bit in such example devices is automatically reset in response to any writes to the first register, if there are any intervening writes during a read-modify-write operation they will always result in the freshness bit being reset. Thus, the freshness bit may indicate, among other things, whether or not the data of the first register is still "fresh", i.e., whether there have been any intervening writes to the first register. Because the processing circuitry performs the register transfer (i.e., completes the read-modify-write operation) if and only if the freshness bit is asserted, and because the freshness bit is not asserted if any intervening writes have occurred, the example devices automatically prevent the read-modify-write operation from being completed if there have been any intervening writes to the first register. Thus, race condition problems may be automatically avoided. In particular, if there is an intervening write to the first register, the intervening write is not unintentionally cleared when the management engine attempts to writes back to the first register because the register transfer is automatically prevented.

In addition, the first register may include a write-failed bit that may be set when the register transfer is requested and the freshness bit is not currently asserted (i.e., when the register transfer fails). Thus, the management engine may be made aware that the register transfer failed, and thus the management engine may deduce that an intervening write may have occurred and take appropriate action to account for this (such as perform another read-modify-write).

Example devices described herein may avoid race condition problems without "locking" the registers. In particular, certain approaches such as hardware semaphores may attempt to avoid race condition problems by locking a resource until something occurs that unlocks the resource—for example, preventing access to a shared memory location until a processor that previously read the location has written back to it. In contrast to such locking approaches, in example devices described herein, when the management engine performs a read-modify-write, the first register is still accessible to the processing circuitry (i.e., it is not locked) throughout the entire operation. For example, the processing circuitry may be free to write to the first register in the period of time between when the management engine reads the first register and writes back to the second register.

In addition, example devices described herein may avoid race condition problems without needing to compare the values that were previously read from the first register to the current values of the first register upon a write back. In particular, certain approaches sometimes referred to as compare-and-swap approaches may attempt to avoid race condition problems by, immediately before writing back to a shared memory location, reading what is currently stored in the memory location and comparing it to what was previously read from the memory location, and preventing the write back from being completed if the currently stored data is different from the previously stored data. In contrast to such compare-and-swap approaches, in example devices described herein, when the management engine writes back to the second register and requests a register transfer, neither the management engine nor the processing circuitry needs to read the values that are currently stored in the data bits of the first register or compare such values to the previously read values in order to determine whether or not to allow the transfer. Instead, in example devices, the determination of whether or not to allow the register transfer depends on whether a single bit (the freshness bit) is asserted. Moreover, in contrast to such compare-and-swap approaches, example devices described herein may not require means for keeping track of the originally read data values or means for comparing the originally read values to the currently stored data values.

Moreover, example devices described herein may avoid race condition problems in a manner that also avoids what is occasionally referred to as the ABA problem or ABA-type race condition problem. The ABA problem may occur when, during a read-modify-write operation of a shared memory location, multiple intervening writes to the memory location occur in such a manner that the data stored in the memory location upon the write back occurring is identical in bit pattern to the data that was originally read. For example, suppose a memory location stores "A" when initially read, is subsequently written to "B", and then is subsequently written again to "A", after which the write back occurs. At the time of the write back, the currently stored data is identical to the initially read data, and therefore a compare-and-swap approach would determine that everything is fine and proceed with the write back, since the old data matches the current data. This can be problematic, for example, because the intervening write to "B" and the second intervening write to "A" may fail to be recognized, and thus useful information may be lost. For example, in the context of hardware management circuitry communicating with a management engine, each time the bit is written to "A" may indicate an occurrence of a hardware event, and since the management engine is unaware of the second intervening write, the management engine may be unaware of the second occurrence of the hardware event. Thus, it is possible for the bit to be cleared (thus showing no event) even though the second occurrence of the event is still applicable. In contrast, example devices disclosed herein may avoid the ABA problem, as the freshness bit is reset whenever there is an intervening write to the first data bits, and therefore the register transfer is prevented if there have been any intervening writes regardless of whether the intervening writes result in the first data bits having the same values that they originally had.

Certain compare-and-swap approaches attempt to mitigate the ABA problem by adding a counter, where the counter is incremented each time that a write occurs to the memory location. In such approaches, when the memory location is initially read, the current value of the counter (which may, for example, be stored in a portion of the memory location) may also be read, and immediately prior to the write back the current value of the counter may be compared to the value of the counter that was initially read (along with comparing the current data values to the initially read data values), and a write may be permitted only if the counter values match. This approach can mitigate some ABA problems because, if intervening writes of the ABA type occur, then in many cases the current counter value will be different from the initially read counter value, and thus the fact that intervening writes occurred is revealed. However, such counters do not fully eliminate the ABA problem, since it is possible for some intervening writes of the ABA type to go unnoticed. In particular, the counter values are chosen from a finite set and, if there are enough intervening writes, the initially used counter value may end up being used again, and therefore the current counter value could be equal to the initial counter value even though there were intervening writes. For example, suppose there are eight values the counter can take, the initially read counter value is "4", and the counter value immediately prior to write back is also "4"—it cannot be determined a priori whether the match between the initial counter value and the current counter value results from there being no intervening writes (the counter did not change) or from there being eight intervening writes (the counter changed eight times and wrapped back around to 4). In contrast to such approaches, example devices disclosed herein do not rely on a counter to identify intervening writes. Moreover, in example devices disclosed herein there is no possibility for the occurrence of intervening writes to be missed, regardless of how many intervening writes occur, since after any intervening write the freshness bit is reset. Moreover, in example devices a single bit determines whether an intervening write is identified, and there is no need to provide means for keeping track of originally read counter values, means for generating new counter values in response to intervening writes, or means for comparing current counter values to the originally read counter values.

[Example Device]

FIG. 1 illustrates an example device 100. The device 100 may be any computing device, such as, for example, a server. The device 100 may include processing circuitry 200 and a management engine 300. The processing circuitry 200 may include a register-based communications interface comprising a first register 210 and a second register 220. The processing circuitry 200 may also include logic circuitry 230 and event monitoring circuitry 240. The management engine 300 may include a processor 301 and a non-transitory machine readable storage medium 302 storing machine readable instructions that, when executed by the processor 301, form the management engine 300. For example, the management engine 300 may be formed by a BMC, with the processor 301 being a processor of the BMC.

The processing circuitry 200 may be any form of dedicated hardware (e.g., a complex programmable logic device (CPLD), an application specific integrated circuit (ASIC), a field-programmable gate array (FPGA), an application-specific instruction set processor (ASIP), or the like) that is to monitor for events and notify the management engine 300 of detected events. The first and second register 210, 220 and the logic circuitry 230 will be described in greater detail below. The event monitoring circuitry 240 may be any dedicated hardware that is to receive input signals, apply rules to the input signals to detect events, and generate signals to indicate detected events. The rules that the event monitoring circuitry 240 applies to the input signals may vary according to the desired application for the processing circuitry 200, and may be embodied in the form of logic circuits within the event monitoring circuitry 240. For example, the rules may include determining whether the value of an input signal exceeds a threshold value, determining whether the value of an input signal changes, determining whether the value of an input signal exceeds a threshold value more than a threshold number of times in a given period, and so on.

Figure 15:
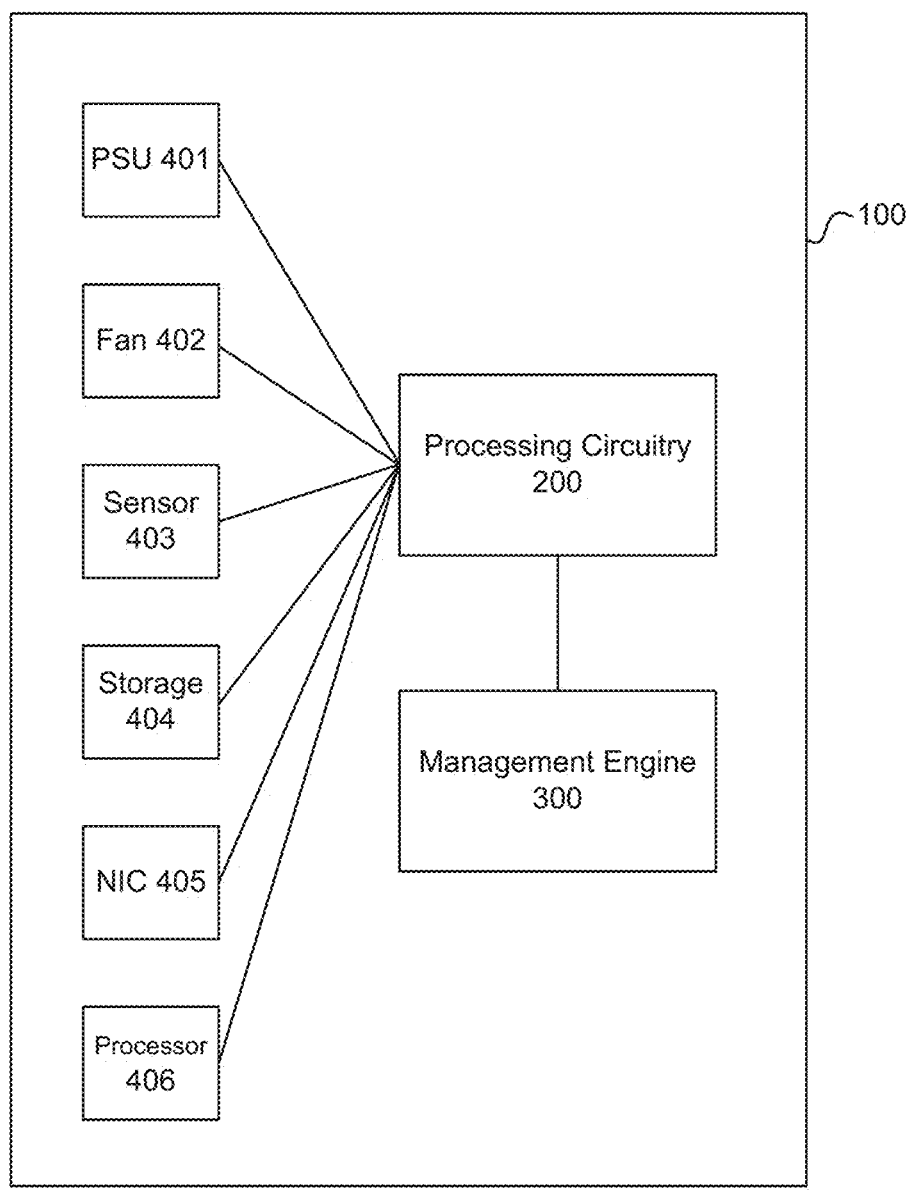
FIG. 15 illustrates an example device with example processing circuitry, an example management engine, and example hardware monitored by the example processing circuitry.

For example, the event monitoring circuitry 240 may be a hardware monitoring device that monitors other hardware components of the device 100 for hardware events. Hardware events may include any status of the monitored hardware that is considered relevant for the particular application of the processing circuitry 200. Examples of hardware events may include, for example, loss of power, failure of a component or process, excessive temperature, ready status, busy status, etc. FIG. 15 illustrates one example in which the event monitoring circuitry 240 of the processing circuitry 200 is a hardware monitoring device. As illustrated in FIG. 15, examples of hardware of the computing device 100 that the processing circuitry 200 may monitor include a power supply unit (PSU) 401 that provides power to the computing device 100, a fan 402, a sensor 403 (such as a temperature sensor), a storage medium 404 (such as a disk drive or flash device), a network interface card (NIC) 405 that provides a communications interface with external devices, and a processor 406 (such as a CPU, a GPU, a digital signal processor (DPS), etc).

To aid illustration, various descriptions herein focus on an example in which the event monitoring circuitry 240 is a hardware monitoring device; however, it should be understood that this is merely one example, and that the event monitoring circuitry 240 could be otherwise. For example, the event monitoring circuitry 240 could be dedicated hardware for monitoring devices that are external to the device 100, such as sensors, actuators, etc. As another example, the event monitoring circuitry 240 could be dedicated hardware for monitoring non-hardware components of the device 100 (such as an operating system and/or various engines).

The management engine 300 may be formed when the processor 301 executes a particular set of machine readable instructions stored on the storage medium 302. The management engine 300 may be any engine that processes information about detected events that is communicated by the processing circuitry 200. In this context, "processing" the information or "performing predetermined processing" on the information means executing any process specified by machine readable instructions that uses the information as an input. For example, if the information communicated by the processing circuitry 200 indicates detected hardware events, "processing" the information may include determining whether the hardware event is still relevant, determining whether to clear the event, determining corrective actions to respond to the event, preforming corrective actions, and/or the like. The management engine 300 is illustrated as being part of the device 100 for convenience, but in certain examples the management engine 300 could be separate from the device 100, such as on a remote device (not illustrated) such as an administrator's computing device.

To aid illustration, various descriptions herein focus on an example in which the management engine 300 is a server management engine; however, it should be understood that this is merely one example, and that the management engine 300 could be otherwise. In particular, various example operations were described above that certain server management engines may perform, but it should be understood that the management engine 300 does not necessarily perform all or even any of these are operations (although certain examples of the management engine 300 may well be configured to perform some or all of these operations).

[Example First and Second Registers and Example Logic Circuitry]

The first register 210 and the second register 220 may each include a collection of memory elements, referred to herein as bits, which store digital values. For example, each of the bits may include a flip-flop whose output signal comprises the logical value of the bit. A flip-flop is merely one example of a memory element, and any memory elements may be used.

The bits of the first register 210 may include a number of first data bits (D1). Each of the first data bits D1 may correspond to a particular event that the event monitoring circuitry 240 monitors such that, when an event is detected, the corresponding first data bit D1 is asserted to communicate this fact to the management engine 300. In particular, the event monitoring circuitry 240 may send a signal to the logic circuitry 230 to indicate that a particular event has been detected, and in response the logic circuitry 230 may automatically set the one of the first data bits D1 that corresponds to the detected event.

The bits of the second register 220 may include a number of second data bits (D2). The second data bits D2 correspond respectively to the first data bits D1. Thus, if there are N first data bits D1_1 through D1_N, where N is any integer equal to or greater than one, then there may be N second data bits D2_1 through D2_N. The second data bits D2 may be used by the management engine 300 to communicate with the processing circuitry 200. Moreover, the second data bits D2 may be used by the management engine 300 to indirectly write to the first register 210. In particular, in certain examples, the first register 210 may be read-only for the management engine 300, i.e., the management engine 300 cannot directly write to the first register 210. However, in certain examples the management engine 300 may indirectly write to the first register 210 by writing to the second register 220 and requesting a register transfer. A register transfer atomically transfers the values of the second data bits D2 to their respectively corresponding first data bits D1—e.g., the value of D2_1 is transferred to D1_1, the value of D2_2 is transferred to D1_2, and so on.

Such a register transfer may be used by the management engine 300 to, for example, clear a first data bit D1 that is asserted in the first register 210. The management engine 300 may want to clear an asserted first data bit D1, for example, because it has determined that the event indicated by the asserted first data bit D1 is no longer relevant (e.g., it has been resolved). Thus, the management engine 300 and the processing circuitry 200 may cooperatively monitor the events, and may both modify (directly or indirectly) the first register 210 accordingly.

The bits of the first register 210 may also include a freshness bit (Fresh). The value of the freshness bit Fresh may be used by the logic circuitry 230 to determine whether or not to perform a register transfer. In particular, the freshness bit Fresh, when asserted, indicates that the data held in the first data bits D1 is still fresh, i.e., the data bits D1 have not been written to since the freshness bit D1 was set. The logic circuitry 230 may automatically set the freshness bit in response to the management engine 300 initiating a read of the first register 210. Furthermore, the logic circuitry 230 may automatically reset the freshness bit Fresh whenever one of the first data bits D1 is written to. Moreover, when the management engine 300 requests a register transfer, the logic circuitry 230 may perform the register transfer if and only if the freshness bit Fresh is asserted.

If the management engine 300 performs a read-modify-write, then the freshness bit Fresh may be set at the beginning of the read-modify-write when the read is initiated. The management engine 300 may then perform processing based on the values read from the first data bits D1, and may write to the second data bits D2 and request a register transfer. The read-modify-write may be completed if/when the register transfer is performed. If no intervening writes to the first data bits D1 occur during the read-modify-write, then the freshness bit Fresh will have remained asserted throughout the operation, in which case the register transfer would be performed when requested and the read-modify-write would be completed. On the other hand, if any intervening writes occurred to the first data bits D1 during the read-modify-write, then the freshness bit Fresh will have been reset, in which case the register transfer would not be performed and the read-modify-write would not be completed. Thus, race condition problems may be avoided.

The logic circuitry 230 may determine that the management engine has initiated a read of the first register 210 in any convenient manner. For example, a read signal may be sent to the logic circuitry 230 from the management engine 300 incident to initiating a read of the first register 210 to indicate that a read is being initiated. As another example, the second register 220 may include a read bit (Read), and the management engine 300 may set the read bit Read incident to initiating a read operation and the logic circuitry 230 may detect the setting of the read bit Read.

The logic circuitry 230 may determine that the management engine has requested a register transfer in any convenient manner. For example, a register transfer signal may be sent to the logic circuitry 230 from the management engine 300 to request the register transfer. As another example, the second register 220 may include a write bit (Write), and the management engine 300 may set the write bit Write to request the register transfer and the logic circuitry 230 may detect the setting of the write bit Write.

The processing circuitry 200 may also be configured to notify the management engine 300 in the event a requested register transfer is not performed. For example, a write failed signal may be sent to the management engine 300 to indicate a failed write. As another example, the first register 210 may include a write-failed bit (W-fail), and the management engine 300 may set the write-failed bit W-fail to communicate to the management engine 300 that the write failed.

The various bits described above may have an "asserted" state and a "not-asserted" state, according to the logical value stored in the bit. When a bit is asserted, this may have a particular meaning (e.g., an event is detected), and similarly when a bit is not-asserted this may have another, generally opposite, meaning (e.g., no event is detected). FIG. 2 illustrates example meanings that correspond to the asserted and not-asserted states for the various bits described above.

The logical value that corresponds to the asserted state and the logical value that corresponds to the not-asserted state may be set arbitrarily for each bit. For example, FIG. 3 illustrated an example in which the logical value 1 corresponds to the asserted state for each bit and the logical value 0 corresponds to the not-asserted state for each bit. However, the example of FIG. 3 is not limiting, and any arbitrary scheme could be used. For example, a scheme opposite to that shown in FIG. 3 may be used. Moreover, the correlation between logical values and asserted/not-asserted states need not necessarily be the same for each bit as it is in FIG. 3—for example, some bits may be asserted when they have the logical value 1 while other bits may be asserted when they have the logical value 0.

It may be determined which logical value of a given bit corresponds to which state (asserted/not-asserted) by determining how the device 100 treats the logical values of that bit—that is, the meaning that the device 100 ascribes to the logical values of the given bit determines which logical value corresponds to which state. For example, if a device 100 permits the register transfer operation when the freshness bit Fresh has the value 0 and prevents the register transfer operation when the freshness bit Fresh has the value 1, then in such an example device 100 the value 0 corresponds to the "asserted" state for the freshness bit Fresh and the value 1 corresponds to the "not-asserted" state for the freshness bit Fresh.

In the actual physical devices that form the bits, physical qualities, such as voltage or current, may be used to represent the logical values—for example, a high voltage may represent 1 and a low voltage may represent 0. Any arbitrary scheme may be used for assigning which values of the physical quality represents which logical values, and this need not necessarily be the same from one bit to the next. Herein and in the Figures, it is assumed for convenience that a high voltage corresponds to the logical value 1, while a low voltage corresponds to the logical value 0. However, one of ordinary skill in the art would understand how the configurations of the devices could be changed to reflect a change in such conventions.

Herein and in the appended claims, reference will be made to a bit being "set" or "reset" or to "setting" or "resetting" a bit, and in all such instances these terms should be understood to be verbs. In particular, a bit being "set" (or "setting" a bit) refers to the act of writing a value to the bit that corresponds to the asserted state. Conversely, a bit being "reset" (or "resetting" a bit) refers to the act of writing a value to the bit that corresponds to the not-asserted state. For example, if the scheme illustrated in FIG. 3 is used, then a bit being "set" means the act of writing a 1 to the bit and a bit being "reset" means the act of writing a 0 to the bit.

On the other hand, as used herein "asserted" and "not asserted" describe the current state of the bits, rather than actions. In particular, a bit is "asserted" if the value currently stored by the bit corresponds to the asserted state, and a bit is "not-asserted" if its currently stored value corresponds to the not-asserted state. For example, if the scheme illustrated in FIG. 3 is used, then a bit is "asserted" if its current value is 1 and "not-asserted" if its current value is 0.

[Read-Modify-Write Examples]

Figure 5:
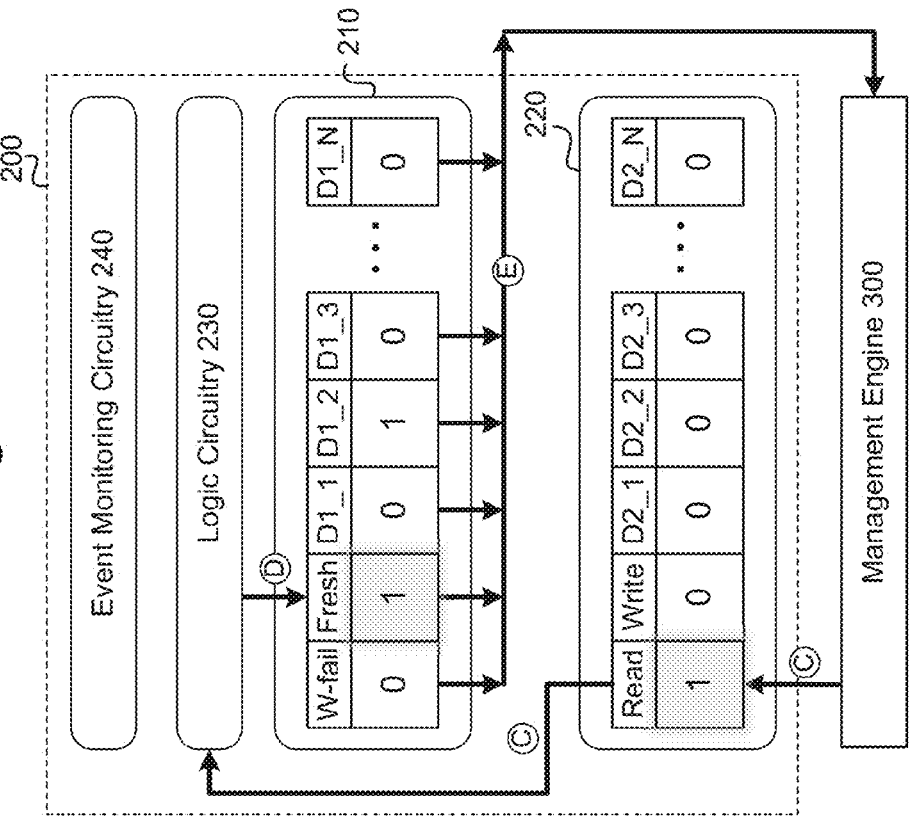
FIG. 5 illustrates example operations of: setting a read bit (operation C), setting the freshness bit (operation D), and reading the first register (operation E), which are performed incident to a read operation subsequent to operation B.
Figure 4:
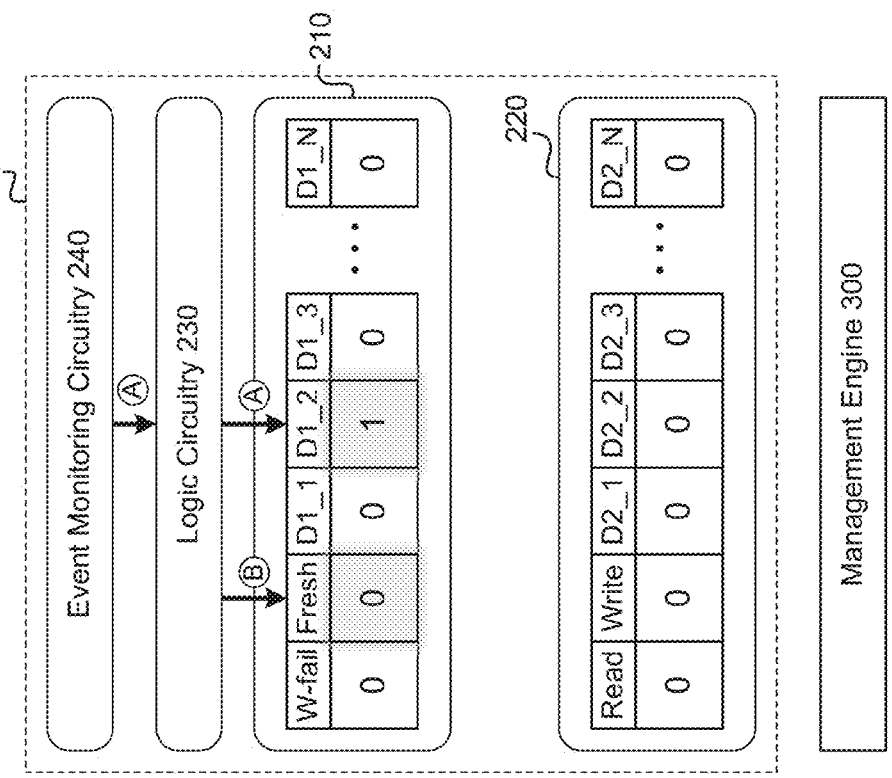
FIG. 4 illustrates example operations of: setting a first data bit (operation A), and resetting a freshness bit (operation B), which are performed incident to the example processing circuitry detecting an event.
Figure 7:
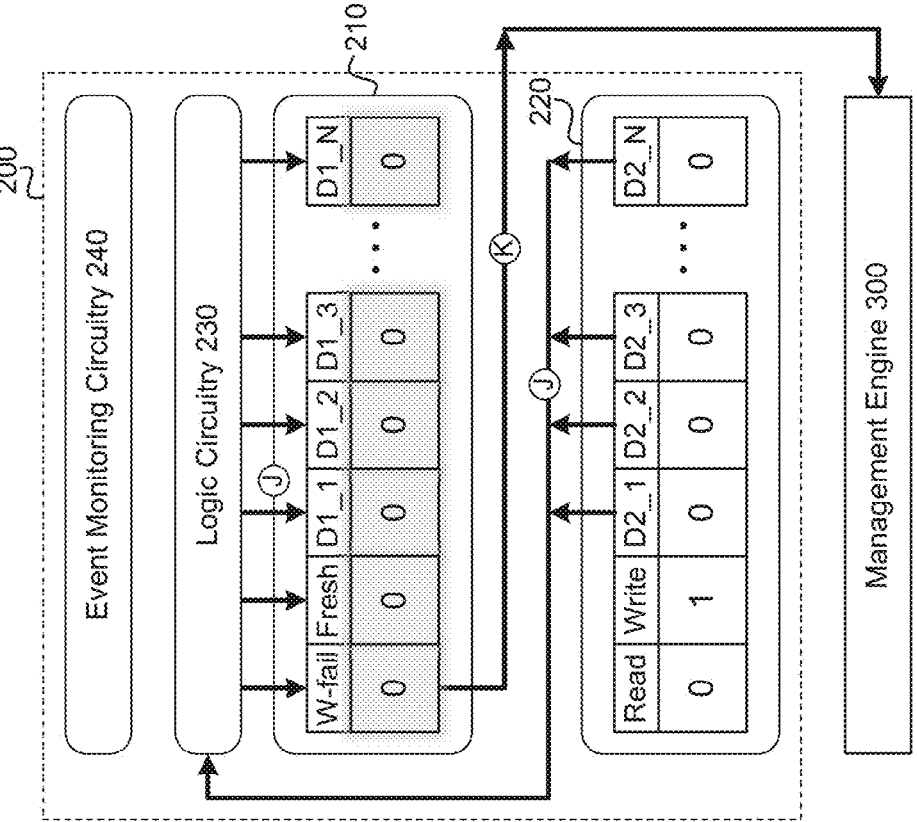
FIG. 7 illustrates example operations of: a register transfer (operation J), and a notification of a successful write (K operation), which are performed as a result of a positive determination in operation G (i.e., the freshness bit is currently asserted).
Figure 6:
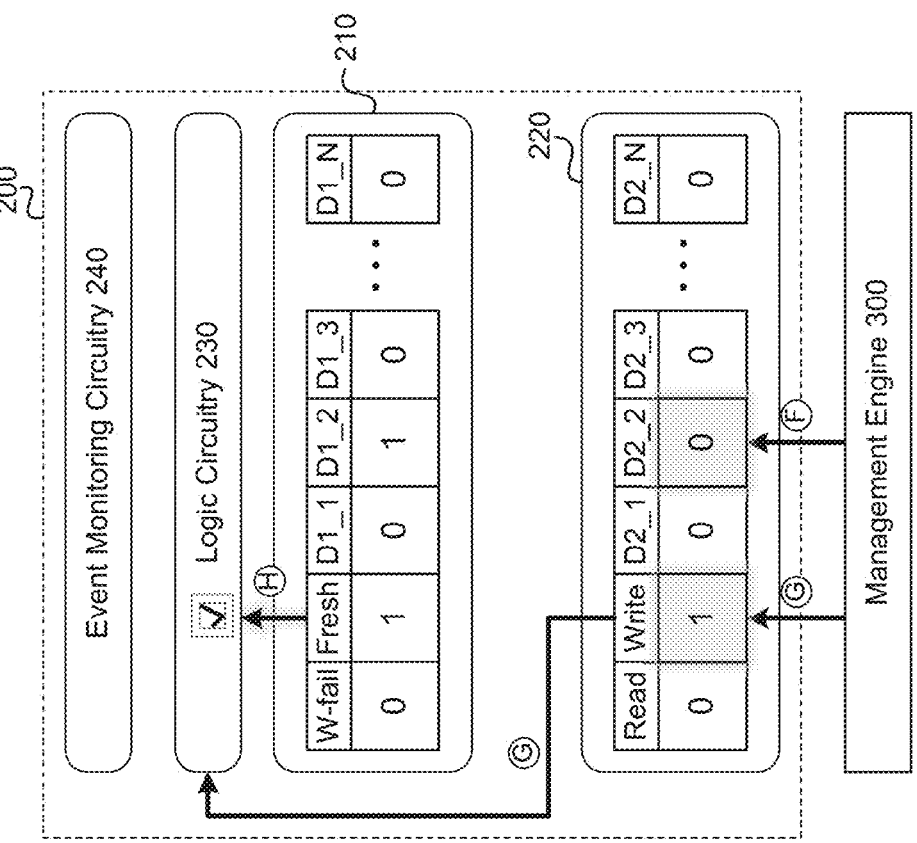
FIG. 6 illustrates example operations of: resetting a second data bit (operation F), setting the write bit (operation G), and checking that the freshness bit is currently asserted (operation H), which are performed incident to a writing operation subsequent to the read operation (operations C-E) with no intervening writes to the first data bits.
Figure 8:
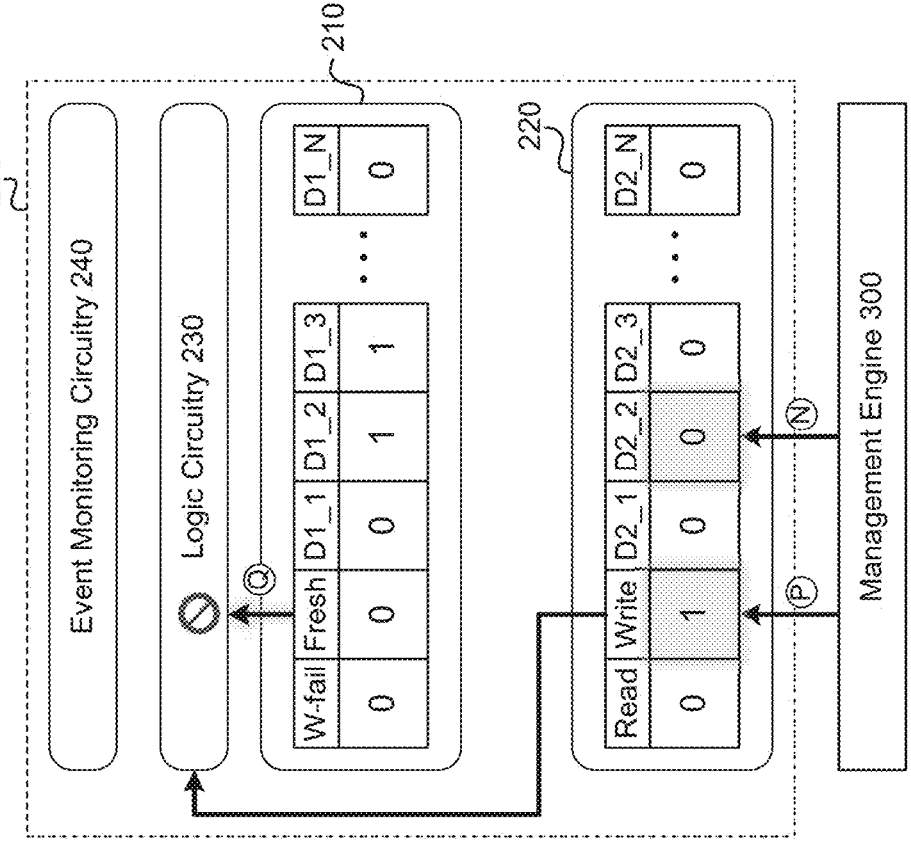
FIG. 8 illustrates example operations of: writing to another first data bit (operation L), and resetting the freshness bit (operation M), which are performed incident to the example processing circuitry detecting another event subsequent to the first register having been read in operation E.
Figure 9:
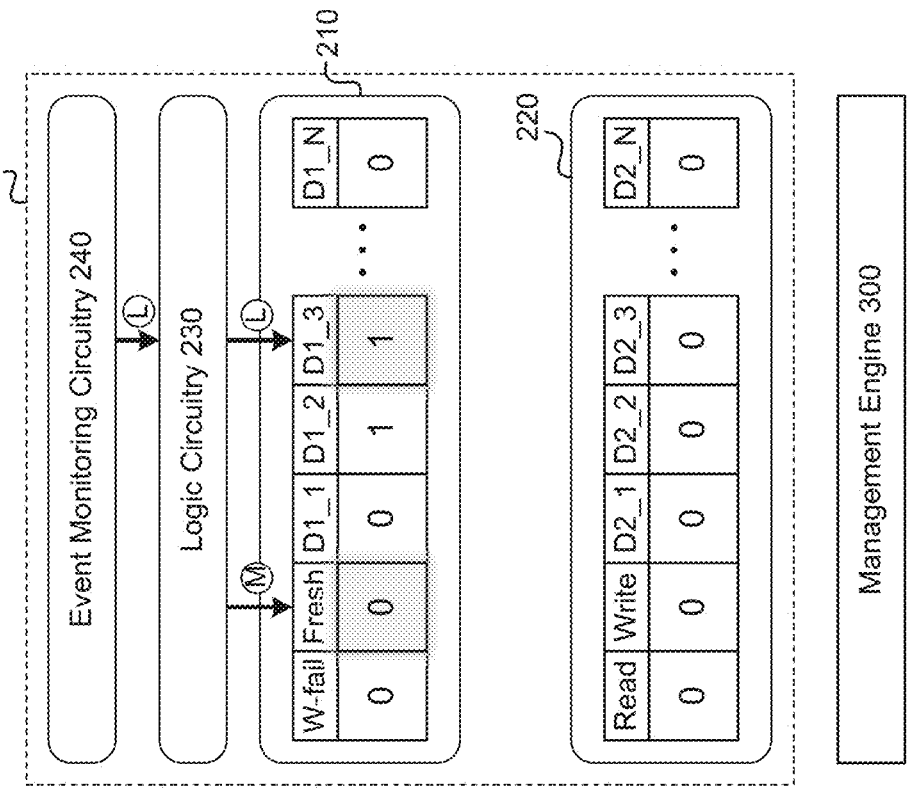
FIG. 9 illustrates example operations of: resetting a second data bit (operation N), setting the write bit (operation P), and checking that the freshness bit is currently asserted (operation Q), which are performed incident to a writing operation subsequent to operation L, wherein there was an intervening write to the first data bits between operation E and operation N.
Figure 10:
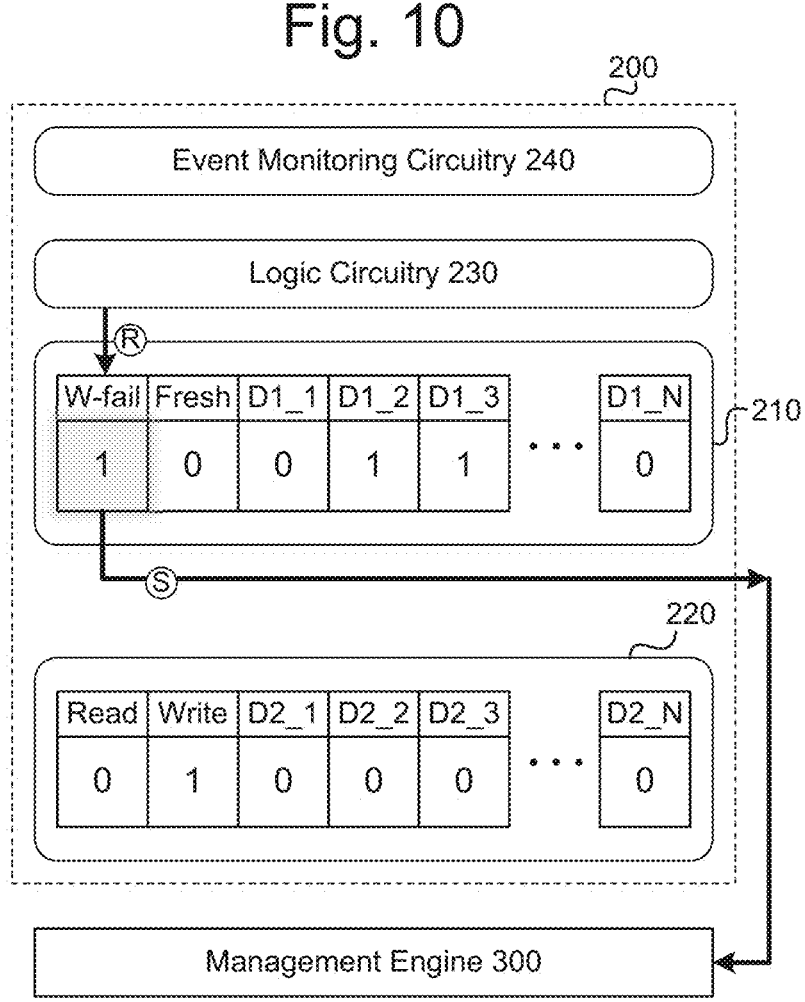
FIG. 10 illustrates example operations of: setting the write fail bit and disallowing the register transfer (operation R), and a notification of a failed write (operation S, which are performed as a result of a negative determination in operation Q (i.e., the freshness bit is currently not-asserted).

FIGS. 4-14 illustrate three example scenarios in which the management engine attempts to perform a read-modify-write. FIGS. 4-7 illustrate a first example in which the read-modify-write is successfully performed without any intervening writes to the first data bits D1. FIGS. 4, 5, and 8-10 illustrate a second example in which the read-modify-write fails due to an intervening write to the first data bits D1. FIGS. 4, 5, and 11-14 illustrate a third example in which the read-modify-write fails due to intervening writes to the first data bits D1 of the type found in the ABA problem. In these examples, it is assumed for the sake of convenience, that the initiation of a read and the request for a register transfer are communicated via a read bit Read and a write bit Write, but it should be understood that this is merely one example. FIGS. 4 and 5 are common to each of the examples, but they will be described only once to avoid duplicative description.

Various reference signs comprising a letter with a circle are included in FIGS. 4-14, which indicate that an action or event illustrated in the Figure corresponds to an action or event that is described herein as part of an "operation" that is denoted by the same letter as the reference sign. It should be understood that, in this context, actions and events are grouped as part of the same "operation" merely for convenience in description. Thus, for example, the fact that two actions/events are described together under the same operation does not necessarily mean that they are performed simultaneously, and conversely the fact that two actions/events are described as part of different operations does not necessarily mean that they are not performed simultaneously. Generally, the order in which the operations are described is not intended to be strictly chronological, unless otherwise indicated.

FIG. 4 illustrates example operations A and B, which are performed incident to detecting an event. FIG. 5 illustrates example operations C-E, which are performed incident to the initiation of a read operation subsequent to operation B.

In an operation A, the event monitoring circuitry 240 detects an event and sends a signal the logic circuitry 230 to indicate this fact, and in response the logic circuitry 230 sets the first data bit D1 that corresponds to the event (for example, first data bit D1_2). In response to the first data bit D1_2 being set, the logic circuitry 230 automatically resets the freshness bit Fresh (operation B). Subsequent to operations A and B, the management engine initiates a read-modify-write operation by initiating a read of the first register 210 (operation C). For example, the management engine 300 may set the read bit Read, which is detected by the logic circuitry 230. In response to the read operation being initiated, the logic circuitry 230 automatically sets the freshness bit (operation D). Then, the management engine 300 reads the first register 210 (operation E).

First Example—No Intervening Write

Upon reading the first register 210 (operation E), the management engine 300 performs its predetermined processing based on the read values of the first data bits D1, and then the management engine 300 writes to the second register 220 based on the results of the processing. For example, having determined that the detected event indicated by D1_2 should be cleared, the management engine 300 resets the corresponding second data bit D2_2 (operation F). For those first data bits D1 that the management engine does not desire to change (e.g., D1_1 and D1_3-D1_N), the management engine 300 may write back the originally read values thereof (in this case, all zeros) to their corresponding second data bits D2 (e.g., D2_1 and D2_3-D2_N). While writing to the data bits or at some time thereafter, the management engine 300 may request a register transfer, for example by setting the write bit Write (operation G).

In response to detecting the request for the register transfer, the logic circuitry 230 may determine whether the freshness bit Fresh is currently asserted (operation H). Because no intervening writes have occurred in this example, the freshness bit Fresh is asserted when the register transfer request is made, and therefore the logic circuitry performs the register transfer (operation J), transferring the values of the second data bits D2 to their respectively corresponding first data bits D1. Thus, the read-modify-write operation is completed successfully, because there were no intervening writes to the first data bits D1.

In addition, in operation J the freshness bit Fresh is reset because first data bits D1 are being written to, and the write fail bit W-fail is reset because the register transfer operation was performed. In operation K, the management engine 300 is informed of the successful write, for example by detecting the 0 value of the write-fail bit W-fail.

Second Example—Intervening Write

In this example, after the management circuitry has read the first register 210 (operation E, FIG. 5) but before the read-modify-write operation is completed, a second event is detected by the event monitoring circuitry and in response the logic circuitry 230 sets the corresponding first data bit D1_3 (operation L). In response to the first data bit D1_3 being set, the logic circuitry 230 automatically resets the freshness bit Fresh (operation M).

The management engine 300 performs its predetermined processing based on the read values of the first data bits D1, and then the management engine 300 writes to the second register 220 based on the results of the processing. For example, having determined that the detected event indicated by D1_2 should be cleared, the management engine 300 resets the corresponding second data bit D2_2 (operation N). For those first data bits D1 that the management engine does not desire to change (e.g., D1_1 and D1_3-D1_N), the management engine 300 may write back the originally read values thereof (in this case, all zeros) to their corresponding second data bits D2 (e.g., D2_1 and D2_3-D2_N). While writing to the data bits or at some time thereafter, the management engine 300 may request a register transfer, for example by setting the write bit Write (operation P).

In this example, if the register transfer were allowed when it is requested, the first data bit D1_3 would be inadvertently cleared and the management engine 300 would not be made aware of the corresponding event—that is, a race condition problem would occur. However, in this case the register transfer is prevented because the freshness bit Fresh is not asserted, and therefore the race condition problem is avoided. In particular, in response to detecting the request for the register transfer, the logic circuitry 230 may determine whether the freshness bit Fresh is currently asserted (operation Q). Because an intervening write occurred in this example, the freshness bit Fresh is not asserted when the register transfer request is made, and therefore the logic circuitry 230 does not perform the register transfer, and instead sets the write-fail bit W-fail (operation R). The management engine 300 detects that the write fail bit W-fail is asserted (operation S), and thereby becomes aware that there was an intervening write, enabling the management engine 300 to take corrective action (such as initiating another read-modify-write).

Third Example—ABA-type Intervening Writes

In this example, after the management circuitry has read the first register 210 (operation E, FIG. 5) but before the read-modify-write operation is completed, the event monitoring circuitry 240 determines that the previously detected event should be cleared and in response the logic circuitry 230 resets the corresponding first data bit D1_2 (operation T). In response to the first data bit D1_2 being reset, the logic circuitry 230 automatically resets the freshness bit Fresh (operation U). Subsequently, the event monitoring circuitry 240 detects another instance of the same event, and thus the first data bit D1_2 is set again (operation V). In response to the first data bit D1_2 being set, the logic circuitry 230 automatically resets the freshness bit Fresh again (operation W)

The management engine 300 performs its predetermined processing based on the read values of the first data bits D1, and then the management engine 300 writes to the second register 220 based on the results of the processing. For example, having determined that the detected event indicated by D1_2 should be cleared, the management engine 300 resets the corresponding second data bit D2_2 (operation X). For those first data bits D1 that the management engine does not desire to change (e.g., D1_1 and D1_3-D1_N), the management engine 300 may write back the originally read values thereof (in this case, all zeros) to their corresponding second data bits D2 (e.g., D2_1 and D2_3-D2_N). While writing to the data bits or at some time thereafter, the management engine 300 may request a register transfer, for example by setting the write bit Write (operation Y).

In this example, if the register transfer were allowed when it is requested, the first data bit D1_2 would be cleared and the management engine 300 would not be made aware of the second instance of the corresponding event—that is, an ABA-type race condition problem would occur. However, in this case the register transfer is prevented because the freshness bit Fresh is not asserted, and therefore the ABA-type race condition problem is avoided. In particular, in response to detecting the request for the register transfer, the logic circuitry 230 may determine whether the freshness bit Fresh is currently asserted (operation Z). Because intervening writes occurred in this example, the freshness bit Fresh is not asserted when the register transfer request is made, and therefore the logic circuitry 230 does not perform the register transfer, and instead sets the write-fail bit W-fail (operation α). The management engine 300 detects that the write fail bit W-fail is asserted (operation β), and thereby becomes aware that there was an intervening write, enabling the management engine 300 to take corrective action (such as initiating another read-modify-write).

[Registers and Logic Circuitry—Detailed Example]

Figure 16:
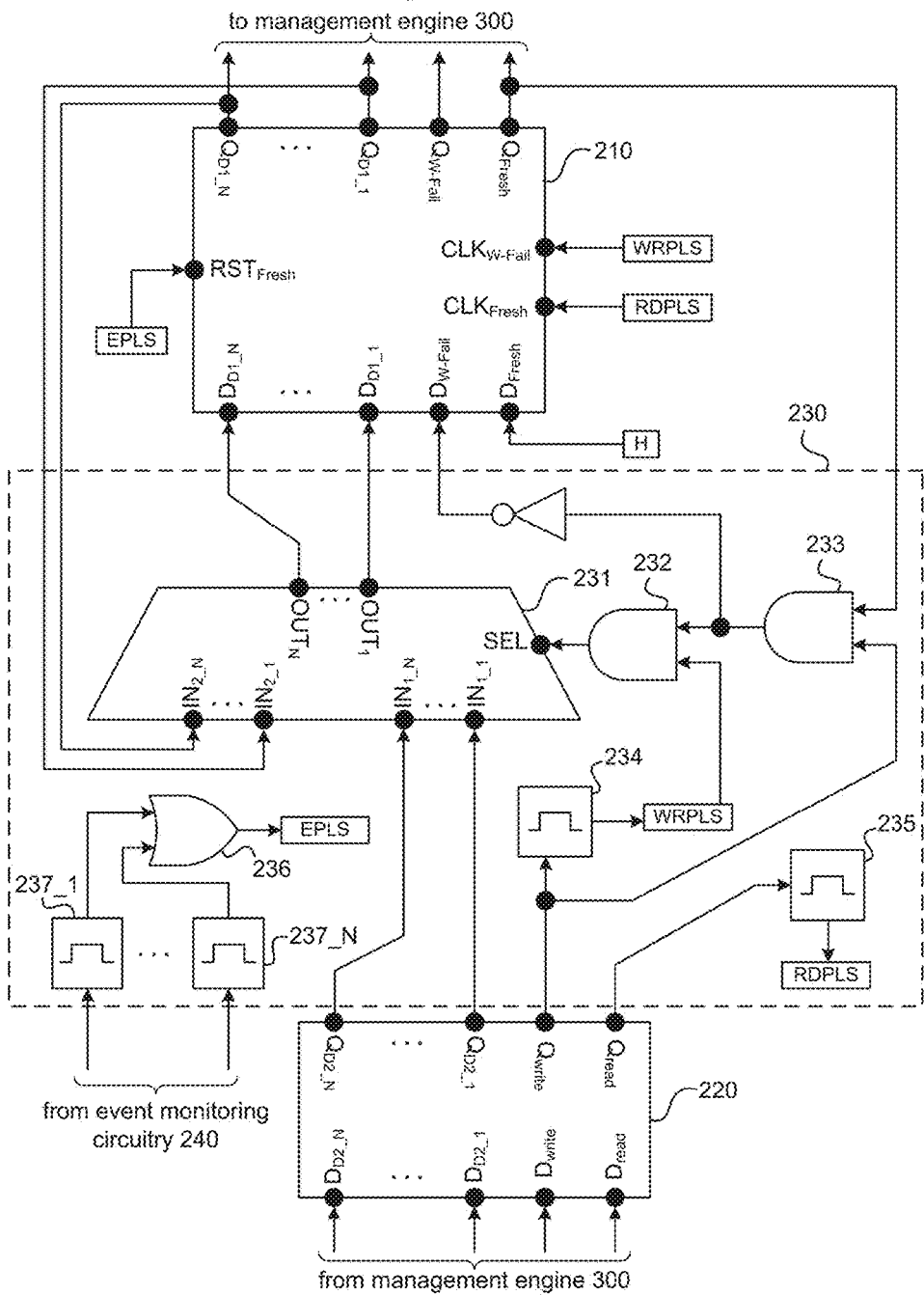
FIG. 16 illustrates example logic circuitry, an example first register, and an example second register.

FIG. 16 illustrates one example of logic blocks that could be used to implement the logic circuitry 230. However, one of ordinary skill in the art of designing logic circuits would understand that alternative arrangements of elements could be used.

In FIG. 16, the first register 210 and the second register 220 have input terminals denoted by D and output determines denoted by Q, with subscripts identifying which bit corresponds to each particular terminal. Other terminals of the first register 210 and the second register 220, such as selection terminals SEL, clock terminals CLK, and reset terminals RST are omitted to simplify the illustration, with the exception of the reset terminal $RST_{Fresh}$, the clock terminal $CLK_{W\text{-}Fail}$, and the clock terminal $CLK_{Fresh}$.

The logic circuitry 230 may include a multiplexor 231 that receives the outputs $Q_{D1\_1}, \ldots, Q_{D1\_N}$ of first register 210 as a first group of inputs $IN_{1\_1}\text{-}IN_{1\_N}$ and the outputs $Q_{D2\_1}, \ldots, Q_{D2\_N}$ of the second register 220 as a second group of inputs $IN_{2\_1}\text{-}IN_{2\_N}$. The multiplexor 231 switches between outputting the first group of inputs $IN_{1\_1}\text{-}IN_{1\_N}$ or the second group of inputs $IN_{2\_1}\text{-}IN_{2\_N}$ at the output terminals $OUT_1\text{-}OUT_N$ based on the selection signal SEL. When the selection signal SEL is pulsed to the value 1, the second group of inputs $IN_{2\_1}\text{-}IN_{2\_N}$ is selected, and otherwise the first group of inputs $IN_{1\_1}\text{-}IN_{1\_N}$ is selected.

The output terminals $OUT_1\text{-}OUT_N$ of the multiplexor 231 are connected to the input terminals $D_{D1\_1}, \ldots, D_{D1\_N}$ of the first register 210. Thus, when the selection terminal SEL of the multiplexor 231 is logical 1, the values held in the second data bits D2 of the second register 220 ($Q_{D2\_1}, \ldots, Q_{D2\_N}$) are fed to the input terminals $D_{D1\_1}, \ldots, D_{D1\_N}$. Thus, the register transfer operation is performed (i.e., the values of the second data bits D2 are atomically transferred to their respectively corresponding first data bits D1) when the selection terminal SEL is pulsed to logical 1.

The output of the AND gate 232 is connected to the selection terminal SEL of the multiplexor 231. The inputs of the AND gate 232 are a write pulse signal WRPLS and the output of the AND gate 233. The write pulse signal WRPLS is generated by the pulse generator 234. In particular, the pulse generator 234 is configured to generate a pulse of value 1 with a specific width (e.g., one clock cycle) in response to the output terminal $Q_{write}$ changing from 0 to 1, and to output 0 otherwise. Thus, when the write bit Write is set, the write pulsed signal WRPLS is pulsed to 1. The inputs of the AND gate 233 are the output terminals $Q_{write}$ of the second register 220 and the output terminal $Q_{Fresh}$ of the first register 210.

Thus, the selection terminal SEL of the multiplexor 231 is 1 only when the output terminal $Q_{write}$, the output terminal $Q_{Fresh}$, and the write pulse signal WRPLS are all the same, which only occurs when the output terminal $Q_{write}$ is set and the output terminal $Q_{Fresh}$ is currently 1. Thus, when the write bit Write is set to request a register transfer, the register transfer operation will be performed if and only if the freshness bit $Q_{Fresh}$ is currently 1.

The output of the AND gate 233 is also connected to the input $D_{W\text{-}Fail}$ via an inverter. The clock terminal of the write-fail bit $CLK_{W\text{-}Fail}$ is connected to the write pulse signal WRPLS. Accordingly, the write fail bit W-Fail is set when the write bit Write is set if the freshness bit $Q_{Fresh}$ is currently 0, and the write fail bit W-Fail is reset when the write bit Write is set if the freshness bit $Q_{Fresh}$ is currently 1.

The input terminal of the freshness bit $D_{Fresh}$ is connected to a constant value of 1, and the clock terminal of the freshness bit $CLK_{Fresh}$ is connected to the read pulse signal RDPLS. Thus, the freshness bit is set to 1 whenever the read pulse signal RDPLS is pulsed to 1. The read pulse signal RDPLS is generated by the pulse generator 235, which generates a pulse of value 1 with a specific width (e.g., one clock cycle) when a read is initiated by the management engine 300.

In FIG. 16, a read is initiated by setting the read bit Read, and therefore the pulse generator 235 takes the output terminal $Q_{read}$ as an input. However, in other examples (not illustrated), the read may be initiated by the management circuitry sending a read signal to the processing circuitry 200, which may be used as an input to the pulse generator 235. In such examples, the read bit Read may be omitted if desired.

The reset terminal of the freshness bit $RST_{Fresh}$ is connected to the event pulse signal EPLS. The reset terminal $RST_{Fresh}$, when pulsed to 1, hard resets the freshness bit Fresh. In this context, hard resetting is a type of resetting that is accomplished by pulsing a reset terminal of a bit (such as $RST_{Fresh}$), as opposed to writing 0 to the input terminal of the bit and waiting for a clock pulse. The hard resetting may occur nearly instantaneously (no waiting for a clock pulse). The event pulse signal EPLS is pulsed high whenever the first data bits D1 are to be written to (set or reset). Thus, the freshness bit is automatically reset whenever the first data bits D1 are to be written to.

In particular, the event pulse signal EPLS may be pulsed high whenever the event monitoring circuitry 240 sends a signal to the logic circuitry 230 indicating that an event has been detected or that a previously detected event should be cleared. For example, the event pulse signal EPLS may be generated by an OR gate 236 with inputs from pulse generators 237_1 through 237_N. The pulse generators 237_1 through 237_N may each corresponds to an event monitored by the event monitoring circuitry 240, and may generate a pulse of 1 with a specific width (e.g., one clock cycle) whenever the event monitoring circuitry 240 sends a signal indicating that the corresponding event has been detected or should be cleared. The logic circuitry 230 may set the corresponding first data bit D1 in response to a signal that an event has been detected, and may reset the corresponding first data bit D1 in response to a signal that an event should be cleared.

The input terminals $D_{D1\_1}$-$D_{D1\_N}$ of the first register 210 may be written to by the logic circuitry 230 in response to the signals from the event monitoring circuitry 240. For example, the first register 210 may include therein multiplexors (not illustrated) that may switch the input terminals $D_{D1\_1}$-$D_{D1\_N}$ between the outputs $OUT_1$-$OUT_N$ of the multiplexor 231 and writing terminals (not illustrated) that the logic circuitry 230 may provide signals to based on the signals from the event monitoring circuitry 240. When the outputs $OUT_1$-$OUT_N$ are selected, the first data bits D1 sample either their own output terminals $Q_{D1\_1}$-$Q_{D1\_N}$ (and hence continue to hold their current values each clock cycle) or the output terminals $Q_{D2\_1}$-$Q_{D2\_N}$ (and hence a register transfer is performed). When the writing terminals are selected, the logic circuitry 230 writes values to the first data bits D1. The first data bits D1 may be clocked by a first clock $C_1$.

The output terminals $Q_{Fresh}$, $Q_{W\text{-}Fail}$, and $Q_{D1\_1}$-$Q_{D1\_N}$ of the first register 210 may be output to the management engine 300 to enable the management engine 300 to read the first register 210. The management engine 300 and/or the processing circuitry 200 may include some form of buffer (not illustrated) for these output signals, such as another register, a memory, etc.

The input terminals $D_{D2\_1}$-$D_{D2\_N}$ of the second register 220 may be written to by the management engine 300. Moreover, the second register 220 may include therein multiplexors (not illustrated) that may switch the input terminals $D_{D2\_1}$-$D_{D2\_N}$ between the second register 220's own output terminals $Q_{Fresh}$, $Q_{W\text{-}Fail}$, and $Q_{D1\_1}$-$Q_{D1\_N}$ and the inputs from the management engine 300. In such an example, when the second register 220's own output terminals $Q_{Fresh}$, $Q_{W\text{-}Fail}$, and $Q_{D1\_1}$-$Q_{D1\_N}$ are selected, the bits of the second register 220 hold their current value each clock cycle, whereas when the inputs from the management engine 300 are selected the values provided by the management engine 300 are written into the bits. The bits of the second register 220 may be clocked by a second clock $C_2$. The first clock $C_1$ and the second clock $C_2$ do not necessarily need to be the same.

[Example Method]

Figure 17:
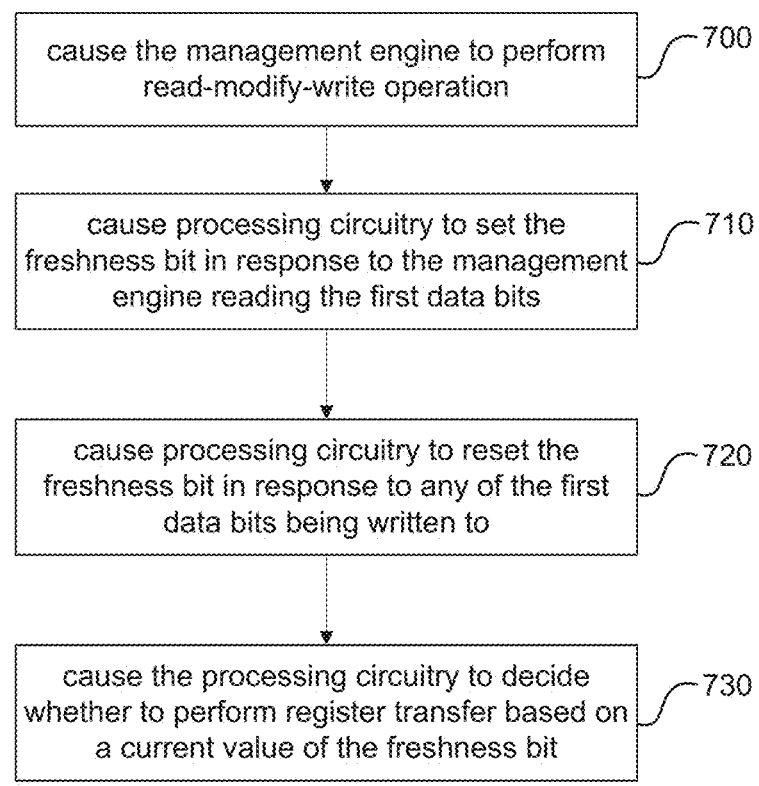
FIG. 17 includes a process flow diagram illustrating an example method of operating a device that includes example processing circuitry and an example management engine that communicate via example shift registers.

FIG. 17 illustrates an example method of operating a device. The device operated by the example method may be a device that includes processing circuitry and a management engine, the processing circuitry including a first register that includes a freshness bit and a number of first data bits and a second register that includes a number of second data bits. For example, the example method may be for operating the example device 100 described above.

In block 700, the management engine is caused to perform a read-modify-write operation. In particular, this may include causing the management engine to read the first data bits, perform predetermined processing based thereon, write to the second data bits based on the predetermined processing, and request a register transfer.

In block 710, the processing circuitry is caused to set the freshness bit in response to the management engine reading the first data bits.

In block 720, the processing circuitry is caused to reset the freshness bit in response to any of the first data bits being written to.

In block 730, the processing circuitry is caused to decide whether to perform a register transfer based on a current value of the freshness bit. In particular, this may include causing the processing circuitry to, in response to the management engine requesting the register transfer, decide whether to transfer or refrain from transferring values of the second data bits to the first data bits based on a current value of the freshness bit.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of first data bits, wherein the first data bits . . . " could encompass both one first data bit and multiple first data bits, notwithstanding the use of the pluralized form.

The use of "a number" in the manner described above should not be interpreted to mean that items that are referred to without the phrase "a number" are necessarily singular. In particular, when items are referred to using the articles "a", "an", and "the", this should be understood to mean that there is "at least one" of the item, unless explicitly stated otherwise. When these articles are used in this way, the word describing the item(s) may be written in singular form for grammatical consistency, but this does not necessarily mean that only one items is being referred to. Thus, for example, a phrase such as "a processor, wherein the processor . . . " could encompass both one processor and multiple processors, notwithstanding the use of the singular form.

While the above disclosure has been shown and described with reference to the foregoing examples, it should be understood that other forms, details, and implementations may be made without departing from the spirit and scope of this disclosure.

What is claimed is:

1. A device comprising:
processing circuitry that includes event monitoring circuitry that monitors for occurrences of one or more events and a communications interface that enables communication between the event monitoring circuitry and another component, the communications interface comprising a first register that the event monitoring circuitry writes to and a second register that the other component writes to:
   the first register includes a freshness bit and a number of first data bits, the event monitoring circuitry communicating the occurrence of one of the events to the other component by setting a corresponding one of the first data bits; and
   the second register includes a number of second data bits that correspond, respectively, to the first data bits such that, when a register transfer operation is performed, each of the first data bits is written with the corresponding second data bit's current value;
wherein the processing circuitry is to:
   set the freshness bit in response to the other component reading the first data bits;
   reset the freshness bit whenever any of the first data bits is set; and
   in response to the other component requesting the register transfer operation, perform the register transfer operation only if the freshness bit is currently asserted.

2. The device of claim 1, further comprising:
a management controller, wherein the management controller is the other component and is to:
   read the first data bits;
   write to the second data bits based on values read from the first data bits; and
   request the register transfer operation by setting a write bit that is included in the second register.

3. The device of claim 2,
wherein the management controller is to analyze events that are indicated by the read values of the first data bits, and upon determining that a given event is no longer applicable, reset the one of the second data bits that corresponds to one of the first data bits that corresponds to the given event and set the write bit.

4. The device of claim 2,
wherein the processing circuitry is allowed to write to the first data bits between when the management controller reads the first data bits and when the management controller sets the write bit.

5. The device of claim 2,
wherein first register is read-only to the management controller and the second register is read-only to the event monitoring circuitry.

6. The device of claim 1,
wherein the first register includes a write-failed bit, and the processing circuitry is to set the write-failed bit if the register transfer operation is requested when the freshness bit is not currently asserted.

7. The device of claim 1,
wherein the processing circuitry is included in a server and the events are hardware events of hardware of the server.

8. A device comprising:
processing circuitry that is to detect occurrences of one or more events; and
a management controller,
wherein the processing circuitry includes a communications interface to communicate with the management controller, comprising:
   a first register that includes a freshness bit and a number of first data bits; and
   a second register that includes a number of second data bits that correspond, respectively, to the first data bits,
wherein the processing circuitry is to notify the management controller of occurrences of the events by setting the first data bits, set the freshness bit in response to the management controller reading the first data bits, and reset the freshness bit if any of the first data bits are written to,
the management controller is to read the first data bits, perform predetermined processing based thereon, write to the second data bits based on the predetermined processing, and request a register transfer, and
the processing circuitry is to, in response to the management controller requesting the register transfer, transfer values of the second data bits to their respectively corresponding first data bits only if the freshness bit is currently asserted.

9. The device of claim 8,
wherein the second register includes a read bit,
the management controller is to set the read bit incident to reading the first data bits, and
the processing circuitry is to set the freshness bit in response to the read bit being set.

10. The device of claim 8,
wherein the second register includes a write bit, and
the management controller requests the register transfer by setting the write bit.

11. The device of claim 8,
wherein the processing circuitry is to monitor for the events and, when a given event of the events is detected, set one of the first data bits that corresponds to the given event in response to detecting the given event.

12. The device of claim 11,
wherein the predetermined processing includes analyzing values read from the first data bits, and
the management controller is to, upon determining that the given event is no longer applicable, reset the one of the second data bits that corresponds to the one of the first data bits that corresponds to the given event and request the register transfer.

13. The device of claim 11,
wherein the processing circuitry is included in a server node and the monitoring for events includes monitoring hardware of the server node for hardware events.

14. The device of claim 8,
wherein the processing circuitry is allowed to write to the first data bits between when the management controller reads the first data bits and when the management controller requests the register transfer.

15. The device of claim 8,
wherein the first register includes a write-failed bit, and
the processing circuitry is to, in response to management controller requesting the register transfer, set the write-failed bit if the freshness bit is not currently asserted.

16. The device of claim 8,
wherein first register is read-only to the management controller and the second register is read-only to the processing circuitry.

\* \* \* \* \*